Patented Feb. 27, 1951

2,543,666

UNITED STATES PATENT OFFICE 2,543,666

PROCESS FOR QUATERNARIZING ANION ACTIVE RESINS

Malden W. Michael, Stamford, Conn., assignor to American Cyanamid Company, New York, N. Y., a corporation of Maine No Drawing. Application July 2, 1949, Serial No. 102,949

6 Claims. (Cl. 260—2)

This invention relates to a process for preparing a new improved anion exchange synthetic resin and more particularly, to a process for increasing the salt splitting capacity of anion exchange synthetic resins.

In the past anion exchange synthetic resins have found wide application for the removal of anions from, or the exchange of anions in, liquid media, particularly aqueous solutions. A large variety of synthetic resins have been proposed for this purpose. Most successful of the resins in anion exchange processes have been the strongly basic derivatives of guanido compounds and of alkylene polyamines. While anion exchange synthetic resins with high capacities for the removal of the anions of strong mineral acids have been developed, no resins having a correspondingly high capacity for the removal of the anions of weak acids such as silica and hydrocyanic acid have been developed up to the present time. The polyamine-epichlorohydrin resins described in U. S. Patent No. 2,469,683 have a higher silica capacity than other known commercial anion exchangers, but even it is relatively low.

It is an object of the present invention to provide an anion exchange synthetic resin having a high capacity for the exchange of anions corresponding to weak acids in, or the removal of anions corresponding to weak acids from, liquid media.

It is another object of the present invention to provide a process for increasing the silica capacity of anion exchange synthetic resins.

Still another object of the present invention is to provide a process for increasing the salt splitting capacity of anion exchange synthetic resins.

A further object of the present invention is to provide a process for the preparation of new and improved anion exchange resins.

Another object of the present invention is the production of new and improved anion exchange synthetic resins.

It is still another object of the present invention to increase the salt splitting capacity of an anion exchange synthetic resin which is a condensation product of epichlorohydrin and a polyalkylene polyamine.

A further object of the present invention is to provide a process for increasing the salt splitting capacity of anion exchange synthetic resins which are reaction products of alkylene polyamines.

It is an object of the present invention to provide a process for quaternarizing tertiary amino groups in an anion exchange synthetic resin.

The above and other objects are attained by treating an aqueous suspension of an anion exchange resin in activated form with two or more different quaternarizing agents stepwise and under alkaline conditions.

The invention will be described in greater detail in conjunction with the following specific examples in which proportions are given in parts by weight. The examples are merely illustrative, and it is not intended that the scope of the invention be limited to the details therein set forth.

EXAMPLE 1

(1) 21 parts sodium hydroxide in 150 parts water (2) 70 parts raw dry tetraethylenepentamine-epichlorohydrin resin prepared in a molar ratio of 1:2.7 according to the procedure of Example 2 of U. S. Patent No. 2,469,683

(3) 30 parts allyl chloride (4) 30 parts epichlorohydrin (5) 6 parts sodium hydroxide in 14 parts water (6) 30 parts sodium bisulfite (1) is charged into a jacketed kettle equipped with a reflux condenser and a turbo type agitator. (2) is added, followed by (3), and the slurry is heated at 43° C. with rapid agitation for 1½ hours. The temperature is lowered to 30° C. and (4) is added, followed by (5). Heating is resumed, this time at 55°–60° C., and continued for 2 hours. The temperature is again reduced to 30° C. and (6) is added. Agitation is continued for 30 minutes at this temperature whereupon the resin is removed from the kettle and thoroughly washed with water.

The resin has a salt splitting capacity of 6.9 kilograins, as calcium carbonate, per cubic foot of resin and a silica capacity of 18.5 kilograins, as $SiO_2$, per cubic foot of resin.

The salt splitting capacity of the resin is determined by completely activating a column of resin with sodium hydroxide and passing a solution containing 900–1000 P. P. M. sodium chloride as calcium carbonate downflow through the column until a break-through of about 40 P. P. M. chloride occurs. The salt splitting capacity is determined by the amount of water obtained until the chloride breaks. By this procedure, activated unalkylated tetraethylenepentamine - epichlorohydrin resin [(2) in Example 1] has a salt splitting capacity of only 1.5–2.0 kilograins, as calcium carbonate, per cubic foot of resin and a silica capacity of 3–4 kilograins, as $SiO_2$, per cubic foot of resin.

As will be seen in Example 2, a resin prepared without the bisulfite washing step has a slightly higher salt splitting capacity than the washed resin of Example 1 above. In spite of this, the washing step is considered desirable in order to counteract the sharp penetrating odor of allyl chloride and its hydrolysis products.

EXAMPLE 2

(1) 21 parts sodium hydroxide in 150 parts water
(2) 70 parts raw dry tetraethylenepentamine-epichlorohydrin resin in a molar ratio of 1:2.7 according to the procedure of Example 2 of U. S. Patent No. 2,469,683
(3) 30 parts allyl chloride
(4) 30 parts epichlorohydrin
(5) 6 parts sodium hydroxide in 14 parts water (1) is charged into a kettle as in Example 1, (2) is added followed by (3), and the slurry is heated at reflux with rapid agitation for 1½ hours. (4) is added and the heating continued for 1 hour. (5) is then added with an additional ½ hour of heating after which the resin is steamed in an effort to remove all traces of the allyl chloride odor.

The resin obtained has a salt splitting capacity of 11.7 kilograins, as calcium carbonate, per cubic foot of resin and a silica capacity of 15.3 kilograins, as $SiO_2$, per cubic foot of resin.

EXAMPLE 3

(1) 21 parts sodium hydroxide in 150 parts water
(2) 70 parts raw dry tetraethylenepentamine-epichlorohydrin resin prepared in a molar ratio of 1:2.7 according to the procedure of Example 2 of U. S. Patent No. 2,469,683
(3) 30 parts allyl chloride
(4) 30 parts benzyl chloride
(5) 6 parts sodium hydroxide in 14 parts water The procedure of Example 2 is followed except that the second heating period, after addition of (4), is 1½ hours. The resin obtained has a salt splitting capacity of 12.8 kilograins, as calcium carbonate, per cubic foot of resin.

EXAMPLE 4

(1) 21 parts sodium hydroxide in 150 parts water
(2) 70 parts raw dry tetraethylenepentamine-epichlorohydrin resin prepared in a molar ratio of 1:2.7 according to the procedure of Example 2 of U. S. Patent No. 2,469,683
(3) 30 parts allyl chloride
(4) 30 parts ethylenechlorhydrin
(5) 6 parts sodium hydroxide in 14 parts water The procedure of Example 2 is followed with heating periods of 1¾ hours, 1 hour and 1 hour, respectively. The resin obtained has a salt splitting capacity of 11.5 kilograins, as calcium carbonate, per cubic foot of resin, a silica capacity of 11.8 kilograins, as $SiO_2$, per cubic foot of resin, and a hydrochloric acid capacity of 18.8 kilograins, as calcium carbonate, per cubic foot of resin.

EXAMPLE 5

(1) 21 parts sodium hydroxide in 150 parts water
(2) 70 parts raw dry tetraethylenepentamine-epichlorohydrin resin prepared in a molar ratio of 1:2.7 according to the procedure of Example 2 of U. S. Patent No. 2,469,683
(3) 30 parts benzyl chloride
(4) 30 parts epichlorohydrin
(5) 6 parts sodium hydroxide in 14 parts water The procedure of Example 2 is followed with heating periods of 1½ hours, 1 hour and ½ hour, respectively. The resin obtained has a salt splitting capacity of 7.6 kilograins, as calcium carbonate, per cubic foot of resin.

EXAMPLE 6

(1) 30 parts sodium hydroxide in 120 parts water
(2) 70 parts raw dry tetraethylenepentamine-epichlorohydrin resin prepared in a molar ratio of 1:2.7 according to the procedure of Example 2 of the U. S. Patent No. 2,469,683
(3) 100 parts diethyl sulfate
(4) 56 parts ethylenechlorhydrin (1) is charged into a kettle as in Example 1, (2) is added followed by (3), and the slurry is heated at reflux with rapid agitation for 1 hour. (4) is added and heating is continued for 1 hour after which the resin is removed from the kettle and thoroughly washed with water. It has a salt splitting capacity of 6.3 kilograins, as calcium carbonate, per cubic foot of resin.

The significant features of the foregoing examples may be set out as follows:

| Example | First Quat. Agent | Second Quat. Agent | Salt Splitting Capacity |
|---|---|---|---|
| | | | untreated resin 1.5–2.0 |
| 1 | allyl chloride | epichlorohydrin | 6.9 |
| 2 | do | do | 11.7 |
| 3 | do | benzyl chloride | 12.8 |
| 4 | do | ethylenechlorhydrin | 11.5 |
| 5 | benzyl chloride | epichlorohydrin | 7.6 |
| 6 | diethyl sulfate | ethylenechlorhydrin | 6.3 |

From the above data it will be apparent that various combinations of quaternarizing agents, added stepwise, increase the salt splitting capacity of an alkylenepolyamine-epichlorohydrin resin. Some combinations are more effective than others, i. e., Examples 2–4, and it is notable that the best results are obtained not only when allyl chloride is one of the quaternarizing agents but when it is used as the first quaternarizing agent. The low value in Example 1 is due to the bisulfite wash.

Comparative Example 1

A (1) 21 parts sodium hydroxide in 150 parts water
(2) 70 parts raw dry tetraethylenepentamine-epichlorohydrin resin prepared in a molar ratio of 1:2.7 according to the procedure of Example 2 of U. S. Patent No. 2,469,683
(3) 30 parts allkyl chloride
(4) 30 parts ethylenechlorhydrin (1) is charged into a vessel as in Example 1, (2) is added followed by (3), and the slurry is heated at reflux for 1¾ hours. (4) is then added, heating is continued for 1¾ hours, and the resin is steamed. It has a salt splitting capacity of 9.3 kilograins, as calcium carbonate, per cubic foot of resin.

B (1) 21 parts sodium hydroxide in 150 parts water and 50 parts isopropanol
(2) 70 parts raw dry tetraethylenepentamine-epichlorohydrin resin prepared in a molar ratio of 1:2.7 according to the procedure of Example 2 of U. S. Patent No. 2,469,683
(3) 30 parts allyl chloride
(4) 30 parts ethylenechlorhydrin The procedure of part A is followed except that (3) and (4) are added together and the slurry is refluxed for 3 hours. The isopropanol is added merely in an attempt to increase contact between the resin and the quaternarizing agents. The resin has a salt splitting capacity of 5.1 kilograins, as calcium carbonate, per cubic foot of resin.

This comparative example demonstrates the superiority of the resin obtained when the two different quaternarizing agents are added stepwise, not both together in a single step. Moreover, addition of a single quaternarizing agent in two or more steps is not particularly advantageous as demonstrated by

*Comparative Example 2*

A (1) 70 parts activated tetraethylenepentamine-epichlorohydrin resin prepared in ammolar ratio of 1:2.7 according to the procedure of Example 2 of U. S. Patent No. 2,469,683.
(2) 150 parts water
(3) 54 parts allyl chloride
(4) 14 parts 30% sodium hydroxide In a suitable vessel as in Example 1, (1) is added to (2), followed by (3). The slurry is heated for 1 hour at 43° C. and cooled to about 30° C. whereupon (4) is added and heating at reflux, 43° C., is continued for 1 hour. The resin, after discharge from the vessel and thorough washing, has a salt splitting capacity of 6.3 kilograins, as calcium carbonate, per cubic foot of resin.

B (1) 70 parts activated tetraethylenepentamine-epichlorohydrin resin prepared in a molar ratio of 1:2.7 according to the procedure of Example 2 of U. S. Patent No. 2,469,683.
(2) 150 parts water
(3) 20 parts allyl chloride
(4) 6 parts sodium hydroxide in 14 parts water
(5) 20 parts allyl chloride
(6) 20 parts allyl chloride (1) is added to (2) in a suitable vessel as in Example 1 followed by addition of (3). The slurry is heated for ¾ hour at 45° C. and cooled for addition of (4). Heating is continued for ½ hour when (5) is added to the cooled solution which is heated again for ¾ hour. (6) is finally added, followed by heating for ½ hour. After washing thoroughly with water, the resin is evaluated and found to have a salt splitting capacity of 6.4 kilograins, as calcium carbonate, per cubic foot of resin.

This comparative example also demonstrates that no sodium hydroxide need be present in the initial stages of the reaction if the resin is already in an activated state.

Furthermore, comparison of the salt splitting capacities of these resins in the preparation of which only allyl chloride was used with those of the resins of Examples 2–4 in which allyl chloride was used in conjunction with a second different quaternarizing agent indicates the necessity for using more than one agent if superior resins are to be obtained.

EXAMPLE 7

(1) 70 parts raw dry anion exchange resin which is a condensation product of acetone, formaldehyde and an alkylene polyamine ("Deacidite")
(2) 70 parts 30% sodium hydroxide in 80 parts water
(3) 30 parts allyl chloride
(4) 20 parts 30% sodium hydroxide
(5) 30 parts epichlorohydrin (1) and then (3) are added to (2) in a jacketed kettle equipped with a reflux condenser and a turbo type agitator, and the slurry is heated at reflux for 1½ hours. (4) is added, then (5), and the slurry is again refluxed for 1½ hours. The resin is washed with water and with bisulfite as in Example 1; it has a salt splitting capacity of 6.0 kilograins, as calcium carbonate, per cubic foot of resin. Without quaternarization by the process of this invention, the above "Deacidite" resin has a salt splitting capacity of 0.25 kilograin, as calcium carbonate, per cubic foot of resin.

EXAMPLE 8

(1) 70 parts raw dry polyethylenepolyamine-epichlorohydrin phenol-formaldehyde anion exchange resin ("Duolite A-2")
(2) 70 parts 30% sodium hydroxide in 80 parts water
(3) 30 parts allyl chloride
(4) 20 parts 30% sodium hydroxide
(5) 30 parts epichlorohydrin The procedure of Example 7 is followed except that the resin is steamed instead of washed with bisulfite. It has a salt splitting capacity of 4.5 kilograins, as calcium carbonate, per cubic foot of resin. Without quaternarization, the resin has no salt splitting capacity.

EXAMPLE 9

(1) 70 parts raw dry polyethylenepolyamine-epichlorohydrin phenol-formaldehyde anion exchange resin ("Duolite A-3")
(2) 70 parts 30% sodium hydroxide in 80 parts water
(3) 30 parts allyl chloride
(4) 20 parts 30% sodium hydroxide
(5) 30 parts epichlorohydrin The procedure of Example 7 is followed. The resin has a salt splitting capacity of 3.4 kilograins, as calcium carbonate, per cubic foot of resin. Without quarternarization, the resin has no salt splitting capacity.

The process of the present invention is particularly applicable to the quaternarization of epichlorohydrin-polyalkylene polyamine condensation products as described in U. S. Patent No. 2,469,683, but it will be apparent from Examples 7, 8 and 9 above that it is also applicable to other anion exchange resins. Suitable resins therefore include epichlorohydrin condensation products of alkylene polyamines as in U. S. Patent No. 2,469,683, glycerol dichlorhydrin condensation products of alkylene polyamines as described in U. S. Patent No. 2,469,683, condensation products of polyepoxy compounds with alkylene polyamines as described in U. S. Patent No. 2,469,683, condensation products of alkylene polyamines, acetone and formaldehyde ("Deacidite"), combinations of phenol-formaldehyde resins and epichlorohydrin-polyalkylene polyamine resins referred to in U. S. Patent No. 2,389,865 and being described in Serial No. 469,940, filed December 23, 1942 ("Duolite A-2"), etc. now abandoned. It will be noted that suitable resins for quaternarization according to my process are those which are derived from alkylene polyamines and more particularly, polyalkylene polyamines. Before quaternarization the resins must, of course, contain tertiary amino groups. Such groups may be present initially in the resin or they may be formed in the reaction mixture by alkylation of primary or secondary amino groups in the resin with whatever alkylating agents are being used for quaternarization according to the process of the present invention.

Any suitable quaternarizing agent may be used although I prefer not using any compound which is normally a gas or which has an extremely low boiling point since the use of such an agent requires pressure equipment. Quaternarizing agents which are preferred in the process of the present invention include dimethyl sulfate, diethyl sulfate, ethylenechlorohydrin, epichlorohydrin, benzyl chloride, allyl chloride, methallyl chloride, allyl bromide, methallyl bromide, ethylene dichloride, trimethylene dibromide, and the like. Particularly striking results are obtained when allyl chloride is one of the quaternarizing agents used in my process and still more striking results are observed when the allyl chloride is used as the first of two or more quaternarizing agents used.

The process of the present invention involves the use of two or more different quaternarizing agents added stepwise to the resin being treated. Incremental addition of a single quaternarizing agent or concurrent addition of two or more different quaternarizing agents is not comparable to the stepwise addition of two or more different quaternarizing agents. This has been demonstrated conclusively by the comparative examples above.

My process for quaternarization is preferably carried out in an aqueous medium. If desired emulsifying agents or other surface active materials or alcohol may be added to increase contact between the quaternarizing agents and the resin, but I have found none of these expedients to be as effective as mere rapid agitation.

Best results are attained when the quaternarization reaction is carried out in an alkaline medium which may be sodium hydroxide, potassium hydroxide, sodium carbonate, calcium hydroxide, a quaternary ammonium base, and the like. The resin to be quaternarized may be used in the raw dry state or in the activated form; if the former, sufficient additional caustic should be added during the quaternarization procedure to ensure activation of the resin.

The salt splitting capacity of a resin, as the term is used in the present specification and claims, is the capacity of a resin to remove the chloride ion from aqueous solution of sodium chloride. It may be conveniently determined by the procedure described in connection with Example 1 of this specification.

The quaternarized resins which are the products of the process of the present invention may be used just as other anion exchange resins. They may be activated or regenerated by treatment with dilute alkaline solutions such as, for example, 0.1%–10% aqueous solutions of sodium hydroxide, sodium carbonate, ammonium hydroxide, etc.

The resinous materials produced in accordance with this invention are suitable for the removal of anions in general from liquid media. They may be used to extract strong mineral acids (preferably present in relatively low concentrations) as well as weaker inorganic acids such as silica, boric acid, hydrocyanic acid and the like, and organic acids such as acetic acid, oxalic acid, etc. from aqueous and other solutions. The anions of salts such as the chloride ion in ammonium chloride or the sulfate ion in ammonium sulfate may be removed by means of my new anion exchange products.

Thus, the anion active resins are useful for many purposes, examples of which are removal of acids from water and from alcoholic solutions, the purification of sugar solutions including cane and beet sugar solutions, molasses, grapefruit, pineapple and other fruit waste, the purification of pectin, gelatin, formaldehyde solutions, etc.

While my new resins are especially suitable for the removal of anions from aqueous media, they may be also used to extract acids or anions from other liquid media, and they may even be used for the extraction of acids from gases.

In addition, the resins prepared by the process of the present invention are particularly applicable for the removal of anions corresponding to extremely weak acids from aqueous solutions. These include silica, hydrocyanic acid, phenol, boric acid, hydroquinone, caffein, aluminum hydroxide, alpha-alanine, arsenious acid, phenolphthalein, stannic acid, and the like.

I claim:

1. A process for increasing the salt splitting capacity of a water-insoluble anion exchange synthetic resin containing tertiary amino groups which comprises treating an aqueous suspension of an activated anion exchange resin with a substantial amount of each of at least two different quaternarizing agents stepwise and under alkaline conditions each step using a different quaternarizing agent.

2. A process for increasing the salt splitting capacity of a water-insoluble anion exchange synthetic resin containing tertiary amino groups which comprises treating under alkaline conditions an aqueous suspension of an activated anion exchange resin first with allyl chloride and then with a different quaternarizing agent, substantial amounts of the allyl chloride and of the different quaternarizing agent being used.

3. A process for increasing the salt splitting capacity of a water-insoluble anion exchange synthetic resin containing tertiary amino groups which comprises treating under alkaline conditions an aqueous suspension of an activated anion exchange resin first with allyl chloride and then with epichlorohydrin, substantial amounts of the allyl chloride and of the epichlorohydrin being used.

4. A process as in claim 1 wherein the anion exchange resin is an epichlorohydrin-alkylene-polyamine condensation product.

5. A process as in claim 2 wherein the anion exchange resin is an epichlorohydrin-alkylene-polyamine condensation product.

6. A process as in claim 3 wherein the anion exchange resin is an epichlorohydrin-alkylene-polyamine condensation product.

MALDEN W. MICHAEL.

REFERENCES CITED

The following references are of record in the file of this patent:

UNITED STATES PATENTS

| Number | Name | Date |
|---|---|---|
| 2,228,514 | Griessbach | Jan. 14, 1941 |
| 2,469,683 | Dudley | May 10, 1949 |
| 2,469,693 | Lundberg | May 10, 1949 |
| 2,481,768 | Mills | Sept. 13, 1949 |